July 5, 1960

J. A. LAUCK 2,943,451

HYDRAULIC TRANSMISSION

Filed May 24, 1957

Inventor:
John A. Lauck
By: Frank C. Parker
Atty.

July 5, 1960

J. A. LAUCK 2,943,451

HYDRAULIC TRANSMISSION

Filed May 24, 1957

Inventor:
John A. Lauck
By: Frank C. Parker
Atty

United States Patent Office 2,943,451
Patented July 5, 1960

2,943,451

HYDRAULIC TRANSMISSION

John A. Lauck, Shaker Heights, Ohio, assignor to Borg-Warner Corporation, Chicago, Ill., a corporation of Illinois Filed May 24, 1957, Ser. No. 661,462

1 Claim. (Cl. 60—53)

This invention relates to a transmission, and more particularly to a hydraulic transmission especially adaptable for providing motive power to the tracks of track driven vehicles as, for example, Crawler Tractors or the like.

The hydraulic transmission of this invention, while being driven by a prime mover, such as a gasoline engine, replaces the standard gear transmission usually a part of mechanical transmissions, and eliminates the need for both the fly wheel friction clutch and the steering clutch required therewith. The transmission of this invention includes a plurality of hydraulic pumps, and a separate hydraulic motor for each track, and is constructed and arranged to provide automatic speed shifting based on the torque requirements at the motor output shaft. In addition, means are provided for manually overriding the automatic operation of the transmission to provide for manual shifting of the transmission including the transmitting of the whole engine power to both or either track as desired.

The transmission of this invention consists essentially of two almost identical transmission units in one package, one for each track. Each of the transmission units includes a plurality of pressure loaded pumps, such as the type described in Lauck et al. United States Patent No. 2,420,622, and means are provided in each of the transmission units to unload at least some of the pumps, so as to render the unloaded pumps ineffective to supply fluid under pressure to the hydraulic motors. Such unloading means include a number of valve means, some of which are controlled by the torque requirements at the hydraulic motor output shaft, and some of which are capable of being controlled manually by the vehicle operator.

Therefore, the principal object of this invention is to provide an improved hydraulic transmission.

A still further object of this invention is the provision of a hydraulic transmission, for driving a track driven vehicle, including a plurality of pumping means and hydraulic motor means associated with each track, wherein full engine power can be transmitted to both or to either track as desired.

In addition, another object of this invention is the provision of an improved hydraulic transmission including hydraulic motor providing a range of different speed drives based on the torque requirements at the hydraulic motors output shafts.

Another and still further object of this invention is the provision of an improved hydraulic transmission providing automatic speed change operation based on torque requirements and including means for manually overriding the automatic control thereof.

These and other objects and features of this invention will become apparent from the following description when taken with the accompanying drawings, in which the same reference characters are employed to refer to the same parts and in which:

Figure 1 is a diagram showing the manner in which Figures 1A, 1B, 1C, 1D, 1E and 1F are to be placed so as to illustrate one embodiment of this invention;

Figures 1A, 1B, 1C, 1D, 1E and 1F are partial schematic illustrations to be placed as shown in Figure 1 to illustrate this invention.

Referring now to the properly placed sheets of drawings, this invention broadly comprises a system including two hydraulic transmissions adapted to power a vehicle such as a crawler tractor each of the transmissions including identical elements and means common to both.

Figures 1, 1E:
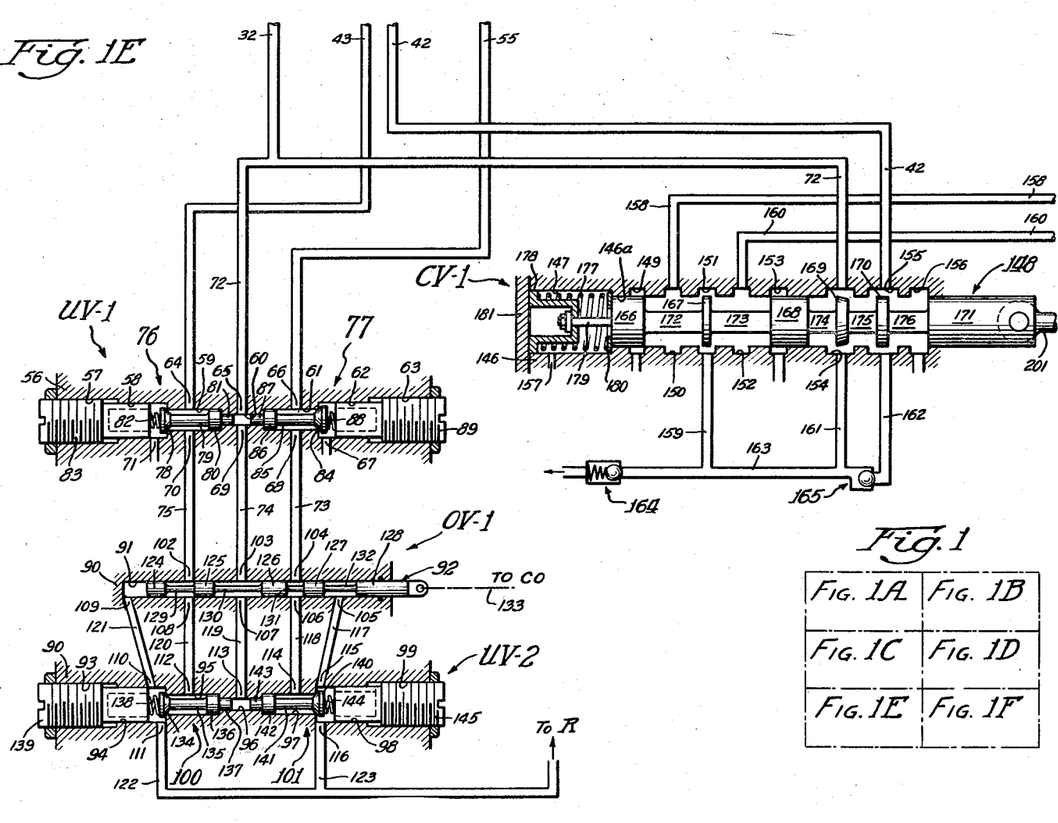
Figure 1A:
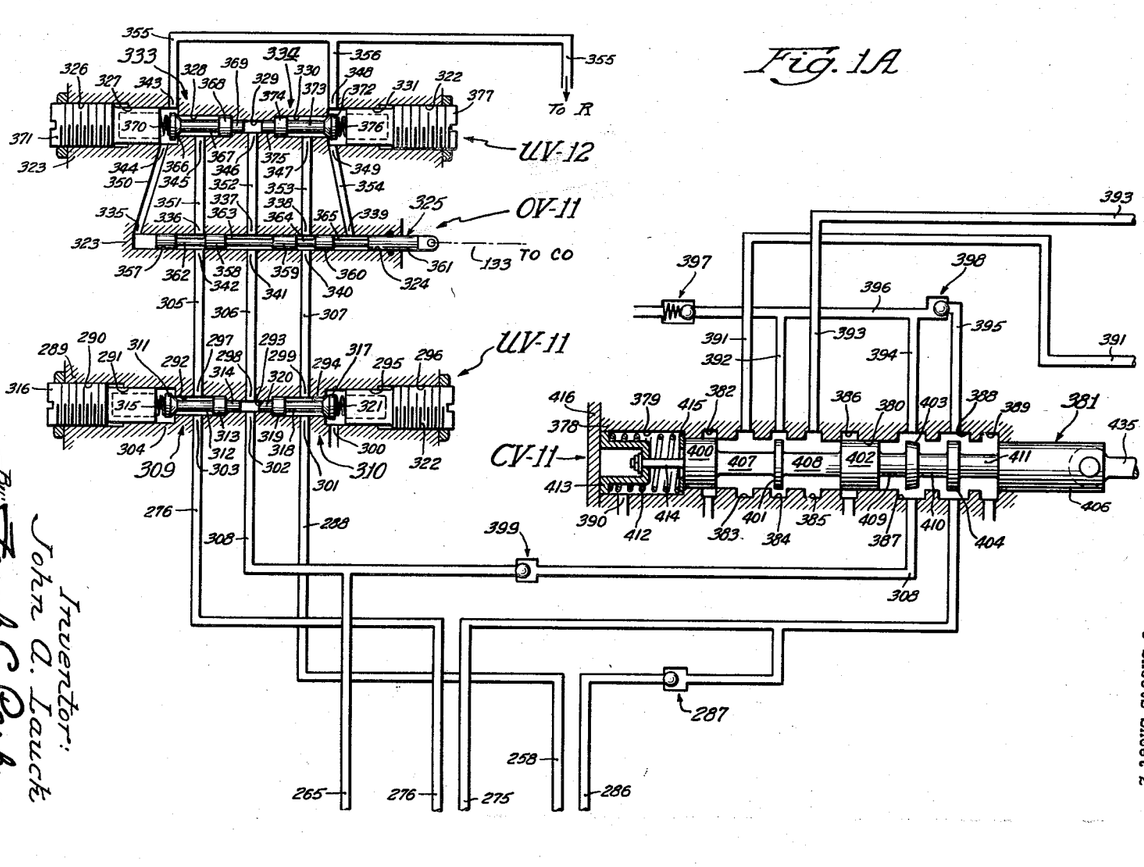
Figure 1B:
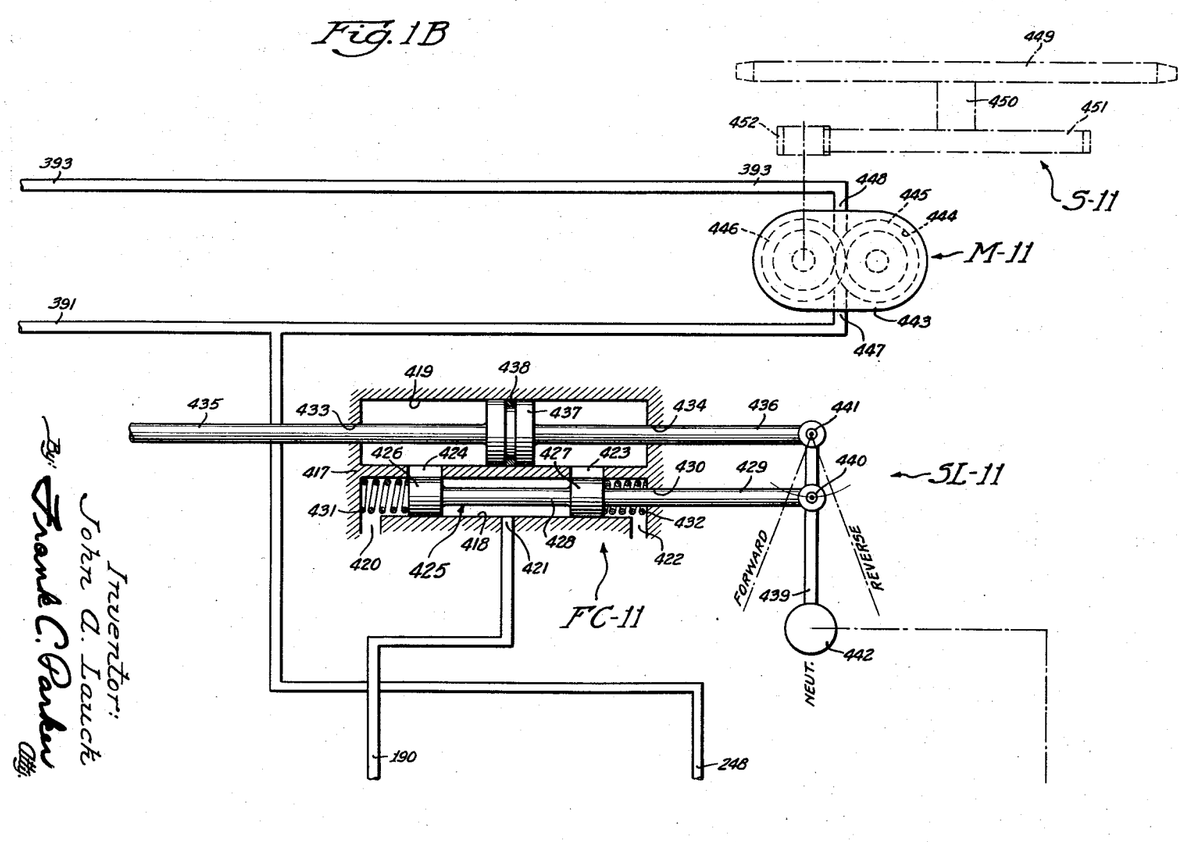
Figure 1C:
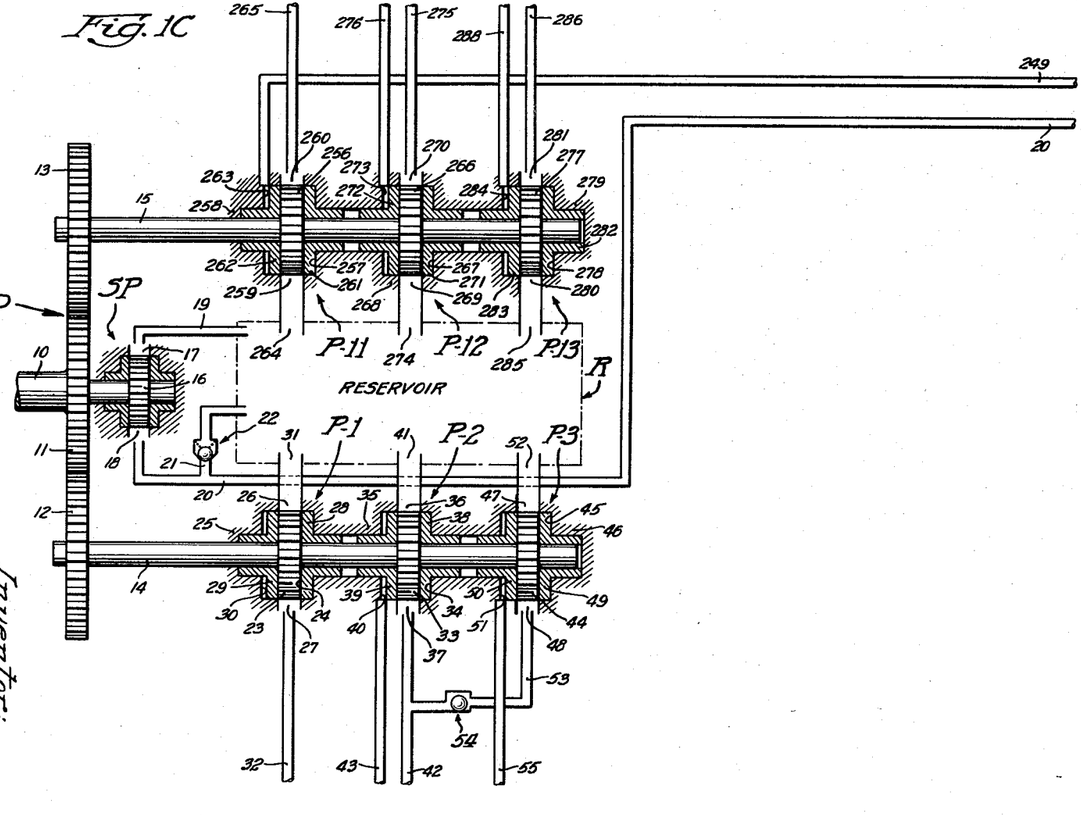
Figure 1D:
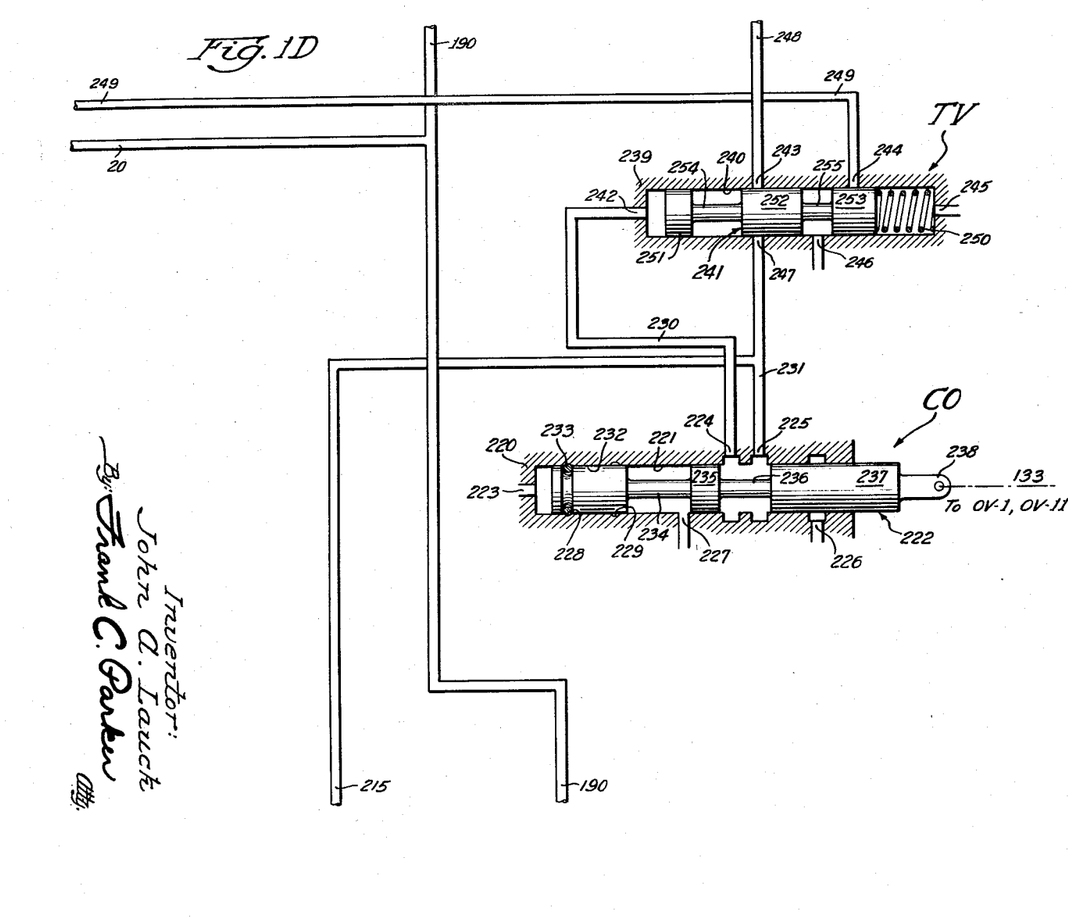
Figure 1F:
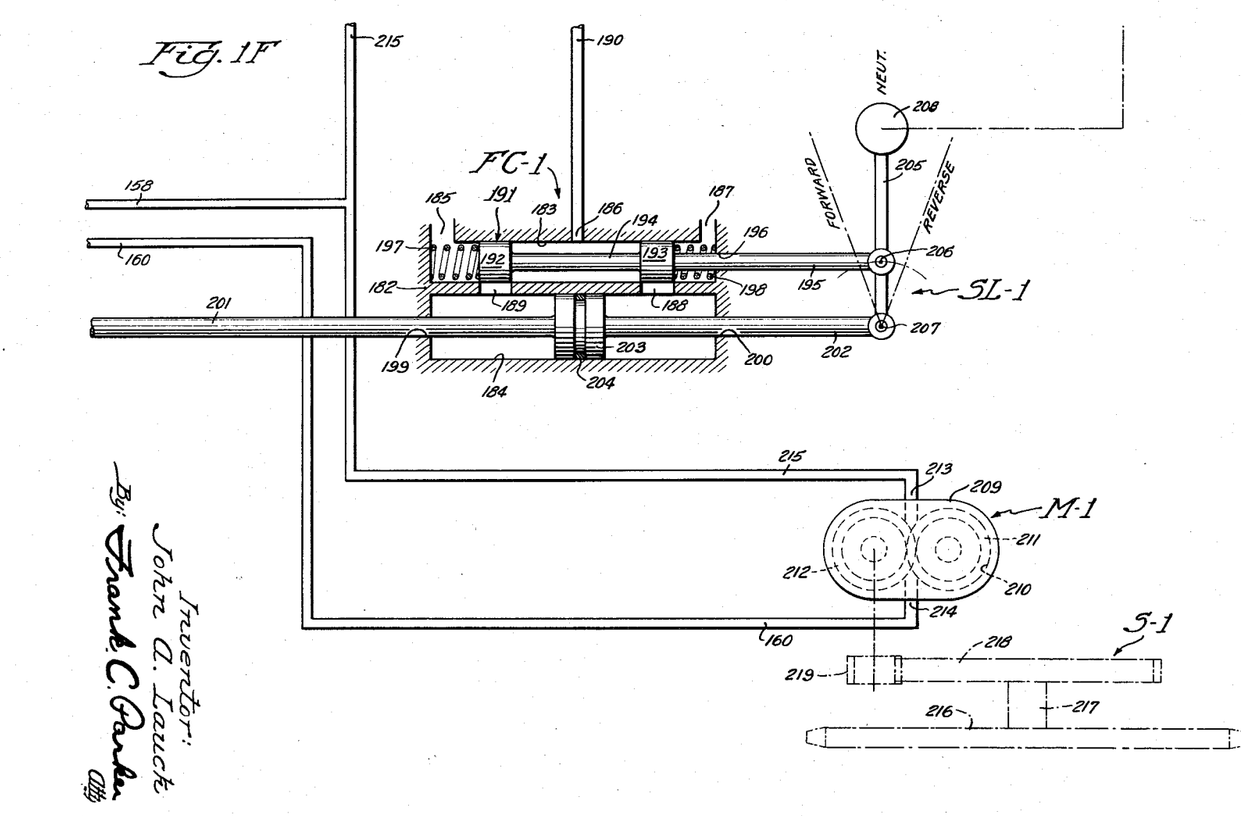

One of transmissions includes pressure loadable pumps P-1, P-2, and P-3, a control valve CV-1, a pair of unloading valves UV-1 and UV-2, an overriding valve OV-1 a follow-up control means FC-1, a hydraulic motor M-1, a shift lever means SL-1 and sprocket drive means S-1. The other transmission includes respective corresponding elements, namely, pressure loadable pumps P-11, P-12, and P-13, a control valve CV-11, a pair of unloading valves UV-11 and UV-12, and overriding valve OV-11, a follow-up control means FC-11, a hydraulic motor M-11, a shift lever means SL-11 and sprocket drive means S-11. Common to both transmissions are a servo pump SP, a reservoir or sump R, a high torque valve TV, and a cut-off valve CO, the latter being connected to the overriding valves OV-1 and OV-11.

The pumps are all illustrated as being of the intermeshing spur gear type (only the driving gear of each shown) and are commonly driven by a driving means D connected to a suitable source of power (not shown).

The driving means D comprises a drive shaft 10 connected to the source of power and having a gear 11 drivingly connected thereto, an extension of the shaft forming the driving means for the pump SP. Gears 12 and 13, drivingly connected to shafts 14 and 15, respectively, are provided, and each meshes with the gear 11. The shaft 14 forms a common driving means for the pumps P-1, P-2 and P-3, and the shaft 15 forms a common driving means for the pumps P-11, P-12 and P-13.

The pump SP is a fixed displacement pump and comprises a pair of intermeshing gears 16, 16 (only one of which is shown), the shown driving gear being drivingly connected to the extension of the shaft 10. The pump SP is provided with an inlet 17 and an outlet 18 to which are respectively connected conduits 19 and 20. The conduit 19 communicates with the reservoir R, and a branch conduit 21 having a one-way relief valve 22 therein communicates the conduit 20 and the reservoir R, the relief valve 22 preventing the build-up of excessive pressure in the conduit 20.

The pump P-1 comprises meshing gears 23, 23, the driving gear (shown) being drivingly mounted on the shaft 14, received in a chamber 24 formed in a housing portion 25. There is provided an inlet 26 and an outlet 27, and the pump includes a fixed bushing or end plate means 28 and an axially movable bushing or end plate means 29, the latter defining with a portion of the housing a pressure receiving chamber 30 in communication with the outlet 27 in the manner taught by the aforementioned Lauck et al. United States patent. Thus, during operation of the pump P-1 the axially movable bushing or end plate means 29 is hydraulically urged into sealing engagement with the adjacent side faces of the gears 23, 23. Each of the bushing or end plate means may be constructed of members individual to the gears or a unitary member, and they include, either as integral parts or suitably affixed parts, cylindrical journal portions embracing the shaft 14. The inlet 26 is connected to the reservoir R by means of a conduit 31, and the outlet 27 has connected thereto a conduit 32.

The pump P-2 is similar in construction to the pump P-1 and includes intermeshing gears 33, 33, the driving gear (shown) being drivingly connected to the shaft 14, a chamber 34 in a housing portion 35, an inlet 36, an outlet 37, a fixed bushing or end plate means 38, an axially movable bushing or end plate means 39, the bushing means including cylindrical journal portions embracing the shaft 14, and a pressure receiving chamber 40 defined by the housing and the axially movable bushing means 39. The inlet 36 is connected to the reservoir R by means of a conduit 41, and the outlet 37 has connected thereto a conduit 42. In addition, and unlike the pump P–1, there is provided a conduit 43 connected to the chamber 40, so as to provide relief of the pressure in the chamber in a manner to be described. The bushing or end plate means may be constructed in the manner described with reference to the pump P–1.

The pump P–3 is similar in construction to the pump P–2 and includes intermeshing gears 44, 44, the driving gear (shown) being drivingly connected to the shaft 14, a chamber 45 in a housing portion 46, an inlet 47, an outlet 48, a fixed bushing or end plate means 49, an axially movable bushing or end plate means 50, the bushing means including cylindrical journal portions embracing the shaft 14, and a pressure receiving chamber 51 defined by the housing and the axially movable bushing means 50. The inlet 47 is connected to the reservoir R by means of a conduit 52, and the outlet 48 is connected to a conduit 53 which is connected through a check valve 54 to the conduit 42. Like the pump P–2 there is provided a conduit 55 connected to the chamber 51, so as to provide for relief of the pressure in the chamber in a manner to be described.

The unloading valve UV–1 comprises a housing portion 56 provided with communicating bores 57, 58, 59, 60, 61, 62 and 63; the bores 57, 58, 59 and 60 successively decrease in diameters while the bores 60, 61, 62 and 63 progressively increase in diameters. The housing portion 56 is provided with ports 64, 65, 66, 67, 68, 69, 70 and 71; the ports 64 and 70 communicate with the bore 59; the ports 65 and 69 communicate with the bore 60; the ports 66 and 68 communicate with the bore 61; the port 67, vented to the reservoir R, communicates with the bore 62; and the port 71, also vented to the reservoir R, communicates with the bore 58.

The conduit 43 is connected to the port 64; a conduit 72, to which is connected the conduit 32, is connected to the port 65; the conduit 55 is connected to the port 66; and conduits 73, 74 and 75 are connected to the ports 68, 69 and 70, respectively.

A pair of poppet valves, generally indicated at 76 and 77 are provided in the housing portion 56. The poppet valve 76 comprises a substantially frusto conical portion 78, adapted to seat on a shoulder formed by the juncture of the bores 58 and 59, a groove portion 79 and decreasing diameter substantially cylindrical portions 80 and 81 slidably received in the bores 59 and 60, respectively. The valve 76 is resiliently urged into its seating position, as illustrated, by means of a coil spring 82 received in a bore closure member 83 threadably received in the bore 57 and extending within the bore 58. In a similar manner, the poppet valve 77 comprises a substantially frusto conical portion 84, adapted to seat on a shoulder formed by the juncture of the bores 61 and 62, a groove portion 85 and decreasing diameter substantially cylindrical portions 86 and 87 slidably received in the bores 61 and 60, respectively. The valve 77 is resiliently urged into its seating position, as illustrated, by means of a coil spring 88 received in a bore closure member 89 threadably received in the bore 63 and extending within the bore 62. The spring 82 has a spring valve greater than that of the spring 88, for a purpose to be described. As will be later described, the valve UV–1 is responsive to higher pressures than the later described unloading valve UV–2.

The overriding valve OV–1 and the unloading valve UV–2 are disposed in a housing portion 90 having a first uniformally diametered bore 91 therein to slidably receive a spool valve generally indicated at 92, and communicating bores 93, 94, 95, 96, 97, 98 and 99 to receive a pair of poppet valves generally indicated at 100 and 101, the bores 93, 94, 95 and 96 successively decreasing in diameter and the bores 96, 97, 98 and 99 progressively increasing in diameters. Ports 102, 103, 104, 105, 106, 107, 108 and 109 communicate with the bore 91; ports 110 and 111 communicate with the bore 94; a port 112 communicates with the bore 95; a port 113 communicates with the bore 96; a port 114 communicates with the bore 97; and ports 115 and 116 communicate with the bore 98. The port 102 is connected to the conduit 75; the port 103 is connected to the conduit 74; the port 104 is connected to the conduit 73; the port 105 is connected to a housing passage 117 which is also connected to the port 115; the port 106 is connected to a housing passage 118 which is also connected to the port 114; the port 107 is connected to a housing passage 119 which is also connected to the port 113; the port 108 is connected to a housing passage 120 which is also connected to the port 112; the port 109 is connected to a housing passage 121 which is also connected to the port 110; the port 111 is connected to a conduit 122 which is connected to the reservoir R; and the port 116 is connected to a conduit 123 which is connected to the conduit 122.

The spool valve 92 comprises a plurality of lands 124, 125, 126, 127 and 128 separated by grooves 129, 130, 131, and 132. The land 128 is provided with an outwardly extending portion adapted to have affixed thereto means, such as a flexible cable or the like 133, attached at its other end to the cut-off valve CO, as illustrated.

The poppet valve 100 comprises a substantially frusto conical portion 134 adapted to seat on a shoulder formed by the juncture of the bores 94 and 95, a groove portion 135 and decreasing diameter substantially cylindrical portions 136, 137 slidably received in the bores 95 and 96, respectively. The valve 100 is resiliently urged into its seating position, as illustrated, by means of a coil spring 138 received in a bore closure member 139 threadably received in the bore 93 and extending into the bore 94. In a similar manner, the poppet valve 101 comprises a substantially frusto conical portion 140 adapted to seat on a shoulder formed by the juncture of the bores 97 and 98, a groove portion 141 and decreasing diameter substantially cylindrical portions 142 and 143 slidably received in the bores 97 and 96, respectively. The valve 101 is resiliently urged into its seating position, as illustrated, by means of a coil spring 144 received in a bore closure member 145 threadably received in the bore 99 and extending into the bore 98. The spring 138 has a spring valve greater than that of the spring 144 for a purpose to be described. Also, for a purpose to be later described, the springs 138 and 144 have smaller spring valves than the corresponding springs 82 and 88 respectively, of the unloading valve UV–1, whereby the valve UV–2 is responsive to lower pressures.

The control valve CV–1 comprises a housing portion 146 having communicating bores 146a and 147 therein, the bore 147 having a diameter slightly greater than the diameter of the bore 146a. A spool member, generally indicated at 148 is slidably received in the bore 146a. The bore 146a is provided with annular grooves 149, 150, 151, 152, 153, 154, 155 and 156 which form ports for the valve, and the bore 147 is provided with a port 157. The grooves 149, 153 and 156 and the port 157 are vented directly to the reservoir R. The groove 150 is connected to a conduit 158; the groove 151 is connected to a conduit 159; the groove 152 is connected to a conduit 160; the groove 154 is connected to the conduit 72 and to a conduit 161; and the groove 155 is connected to the conduit 42 and to a conduit 162. The conduits 159, 161 and 162 are all connected to a conduit 163 which is connected through a one-way relief valve 164 to the reservoir R. A check valve 165 is disposed between the conduits 162 and 163, as illustrated.

The spool valve 148 comprises spaced lands 166, 167, 168, 169 and 170 and an extending connection portion 171, separated by grooves 172, 173, 174, 175 and 176. The spool valve 148 is movable between various positions, corresponding to forward, reverse and neutral drives by means connected to the portion 171, and later to be described, and is resiliently urged or returned to its neutral position, as illustrated, by means of a coil spring 177 suitably supported on a movable cup-shaped spring retainer 178 connected to an extension portion 179 of the spool valve 148. The spring acts against a washer 180 abutting the shoulder formed by the juncture of the bores 146a and 147 at one end and a flanged portion of the retainer 178 at the other end. A closure element 181 fixably attached to the housing portion 146 retains the retainer, spring and washer in their assembled relationship. As will be obvious, when the spool 148 is moved to the left, as viewed in the drawings, the washer 180 will also move to the left and the spring 177 will be compressed, so that upon release, the spring 177 will urge the spool to its illustrated position. In a similar manner, when the spool 148 is moved to the right, the retainer 178 will also be moved to the right thereby compressing the spring 177 which upon release will urge the spool to its illustrated position. The land 169 is slightly tapered, as illustrated, for a purpose to be described.

The follow up control means FC-1 comprises a housing portion 182 having a pair of spaced parallel bores 183 and 184 therein. The bore 183 is provided with ports 185, 186, 187, 188 and 189; the ports 185 and 187 are vented to the reservoir R; the port 186 is connected to a conduit 190 which has connected thereto the conduit 20 from the outlet of the servo pump SP; and the ports 188 and 189 are formed in the housing portion 182 between the bores 183 and 184 and communicate the bores 183 and 184.

A spool member, generally indicated at 191, is slidably received on the bore 183 and comprises spaced lands 192 and 193 separated by a groove 194. The spool member is provided with an extending rod-like member 195 which passes through an opening 196 in the housing portion 182 for a purpose to be described. The spool member 191 is urged to its illustrated position by means of coil springs 197 and 198 which act against the outside faces of the lands 192 and 193, respectively.

The bore 184, in addition to the ports 188 and 189, is provided with openings 199 and 200 through which slide rod like means 201 and 202 connected to a slidable piston like means 203 received in the bore 184. An O-ring sealing means 204 surrounds the means 203 as illustrated. The means 201 is connected to the portion 171 of the spool 148 of the control valve CV-1.

The shift lever means SL-1 comprises a movable and pivotable member 205 to which is pivotably attached, as at 206 and 207, respectively, the rods 195 and 202. There is provided an enlarged end portion 208 for engagement by the operator of the vehicle in which the device is incorporated. The member 205 is pivotable at 207 to provide the indicated drive positions thereof and is movable toward and away from the housing portion 182 enclosing the follow up control means FC-1 to provide different speed ratio drives, as will be more fully described in detail.

The motor M-1 comprises an intermeshing spur gear type motor which includes a housing 209 having a chamber 210 therein in which are disposed meshing gears 211 and 212. There are also provided ports 213 and 214 communicating with the motor chamber 210. The ports 214 and 213 may function as inlet or discharge ports depending on the direction of fluid flow. The port 213 is connected to a conduit 215 to which is connected the conduit 158, and the port 214 is connected to the conduit 160.

The sprocket means S-1 includes a sprocket wheel 216 for engagement with a driving track means (not shown) mounted on a stub shaft 217 having a gear 218 drivingly connected thereto. A pinion 219 meshes with the gear 218 to provide a reduction gearing and is connected to the gear 212 of the motor M-1.

The cut-off valve CO comprises a housing portion 220 having a bore 221 therein in which is slidably disposed a spool member 222. The bore 221 is provided with ports 223, 224, 225, 226 and 227 and spaced shallow annular grooves 228 and 229. The ports 223, 226 and 227 are vented to the reservoir R; the port 224 is connected to a conduit 230, and the port 225 is connected to a conduit 231 to which is connected the conduit 215.

The spool member 222 comprises a land 232 having an O-ring seal means 233 therearound, a groove 234, a land 235, a groove 236, and an outwardly extending portion or land 237 having a connection element 238 extending therefrom. Means such as the flexible cable 133 connects the member 238 to the overriding valve means OV-1 and OV-11.

The high torque valve TV comprises a housing portion 239 having a bore 240 therein in which is slidably received a spool member 241. The bore 240 is provided with ports 242, 243, 244, 245, 246 and 247. The port 242 is connected to the conduit 230; the port 243 is connected to a conduit 248; the port 244 is connected to a conduit 249, the ports 245 and 246 are vented to the reservoir R; and the port 247 is connected to the conduit 231.

The spool member 241 which is resiliently urged to its illustrated position by means of a coil spring 250, comprises spaced lands 251, 252 and 253, and grooves 254 and 255.

The pump P-11 is similar in construction to the pumps previously described and includes intermeshing gears 256, 256, the driving gear (shown) being drivingly connected to the shaft 15, a chamber 257 in a housing portion 258, an inlet 259, an outlet 260, a fixed bushing or end plate means 261, an axially movable or end plate means 262, the bushing means including cylindrical journal portions embracing the shaft 14, and a pressure receiving chamber 263 defined by the housing and the axially movable bushing means 262. The inlet 259 is connected to the reservoir R by means of a conduit 264 and the outlet 260 has connected thereto a conduit 265. Also, the conduit 249 is connected to the chamber 263, so as to provide relief of the pressure in the chamber in a manner to be described. The bushing or end plate means may be constructed in the manner described with reference to the pump P-1.

The pump P-12 is similar in construction to the pump P-11 and includes intermeshing gears 266, 266, the driving gear (shown) being drivingly connected to the shaft 15, a chamber 267 in a housing portion 268, an inlet 269, an outlet 270, a fixed bushing or end plate means 271, an axially movable bushing or end plate means 272, the bushing means including cylindrical journal portions embracing the shaft 15, and a pressure receiving chamber 273 defined by the housing and the axially movable bushing means 272. The inlet 269 is connected to the reservoir R by means of a conduit 274, and the outlet 270 is connected to a conduit 275. Also, a conduit 276 is connected to the chamber 273, so as to provide relief of the pressure in the chamber in a manner to be described. The bushing or end plate means may be constructed in the manner described with reference to the pump P-1.

The pump P-13 is similar in construction to the pumps P-11 and P-12 and includes intermeshing gears 277, 277, the driving gear (shown) being drivingly connected to the shaft 15, a chamber 278 in a housing portion 279, an inlet 280, an outlet 281, a fixed bushing or end plate means 282, an axially movable bushing or end plate means 283, the bushing means including cylindrical journal portions embracing the shaft 15, and a pressure receiving chamber 284 defined by the housing and the axially movable bushing means 283. The inlet 280 is connected to the reservoir R by means of a conduit 285, and the outlet 281 is connected to a conduit 286 which is connected through a check valve 287 to the conduit 275. Also, a conduit 288 is connected to the chamber 284. The bushing or end plate means may be constructed in the manner described with reference to the pump P–1.

The unloading valve UV–11 is similar in construction to the unloading valve UV–1 and comprises a housing portion 289 provided with communicating bores 290, 291, 292, 293, 294, 295, and 296, the bores 290, 291, 292 and 293 successively decreasing in diameter while the bores 293, 294, 295 and 296 progressively increase in diameters. The housing portion 289 is provided with ports 297, 298, 299, 300, 301, 302, 303 and 304; the ports 297 and 303 communicate with the bore 292; the ports 298 and 302 communicate with the bore 293; the ports 299 and 301 communicate with the bore 294; the port 300 communicates with the bore 295; and the port 304 communicates with the bore 291. The ports 304 and 300 are vented to the reservoir R; a conduit 305 is connected to the port 297; a conduit 306 is connected to the port 298; a conduit 307 is connected to the port 299; the conduit 288 is connected to the port 301; a conduit 308 is connected to the port 302 and has connected thereto the conduit 265; and the port 303 is connected to the conduit 276.

A pair of poppet valves, generally indicated at 309 and 310, are provided in the housing portion 289. The poppet valve 309 comprises a substantially frusto conical portion 311, adapted to seat on a shoulder formed on the juncture of the bores 291 and 292, a groove portion 312 and decreasing diameter substantially cylindrical portions 313 and 314 slidably received in the bores 292 and 293, respectively. The poppet valve 309 is resiliently urged into its seating position, as illustrated, by means of a coil spring 315 received in a bore closure member 316 threadably received in the bore 290 and extending within the bore 291. In a similar manner, the poppet valve 310 comprises a substantially frusto conical portion 317, adapted to seat on a shoulder formed by the juncture of the bores 294 and 295, a groove portion 318 and decreasing diameter substantially cylindrical portions 319 and 320 slidably received in the bores 294 and 293, respectively. The poppet valve 310 is resiliently urged into their seating position, and illustrated, by means of a coil spring 321 received in a bore closure member 322 threadably received in the bore 296 and extending within the bore 295. The spring 315 has a spring value greater than that of the spring 321, for a purpose to be later described. As will be later described, the valve UV–11 is responsive to higher pressures than the later described unloading valve UV–12.

The overriding valve OV–11 and the unloading valve UV–12 are similar to the overriding valve OV–1 and the unloading valve UV–2 both being disposed in a housing portion 323 having a first uniformly diametered bore 324 therein to slidably receive a spool valve generally indicated at 325, and communicating bores 326, 327, 328, 329, 330, 331 and 332 to receive a pair of poppet valves generally indicated at 333 and 334, the bores 326, 327, 328 and 329 successively decreasing in diameter, and the bores 329, 330, 331 and 332 progressively increasing in diameters. Ports 335, 336, 337, 338, 339, 340, 341 and 342 communicate with the bore 324; ports 343 and 344 communicate with the bore 327; a port 345 communicates with the bore 328; a port 346 communicates with the bore 329; a port 347 communicates with the bore 330; and ports 348 and 349 communicate with the bore 331. The port 335 is connected to a conduit 350 which is also connected to the port 344; the port 336 and the port 345 are interconnected by means of a conduit 351; the ports 337 and 346 are interconnected by means of a conduit 352; the ports 338 and 347 are interconnected by means of a conduit 353; the ports 339 and 349 are interconnected by means of a conduit 354; the port 342 is connected to the conduit 305; the port 341 is connected to the conduit 306; the port 340 is connected to the conduit 307; the port 343 is connected to a conduit 355 which is vented to the reservoir R; and the port 348 is connected to a conduit 356 which is connected to the conduit 355.

The spool valve 325 is similar to the spool valve 92 and comprises a plurality of lands 357, 358, 359, 360 and 361 separated by grooves 362, 363, 364 and 365. The land 365 is provided with an outwardly extending portion adapted to have affixed thereto the flexible cable 133 attached at its other end to the cut off valve CO, as illustrated.

The poppet valve 333 comprises a substantially frusto-conical portion 366 adapted to seat on a shoulder formed by the juncture of the bores 327 and 328, a groove portion 367 and decreasing diameter substantially cylindrical portions 368 and 369 slidably received in the bores 328 and 329 respectively. The poppet valve 333 is resiliently urged into its seating position as illustrated, by means of a coil spring 370 received in a bore closure member 371 threadably received in the bore 326 and extending into the bore 327. In a similar manner, the poppet valve 334 comprises a substantially frusto-conical portion 372 adapted to seat on a shoulder formed by the juncture of the bores 330 and 331, a groove portion 373, and decreasing diameter substantially cylindrical portions 374 and 375 slidably received in the bores 330 and 329, respectively. The valve 334 is resiliently urged into its seating position, as illustrated, by means of a coil spring 376 received in a bore closure member 377 threadably received in the bore 332 and extending into the bore 331. The spring 370 has a spring value greater than that of the spring 367 for a purpose to be later described. Also, the springs 370 and 367 have smaller spring values than the corresponding springs 315 and 321 of the unloading valve UV–11, for a purpose to be later described, whereby the valve VC–12 is responsive to lower pressures.

The control valve CV–11 is similar to the control valve CV–1 and comprises a housing portion 378 having communicating bores 379 and 380 therein, the bore 379 having a diameter slightly greater than the diameter of the bore 380. A spool member, generally indicated at 381 is slidably received in the bore 380. The bore 380 is provided with annular grooves 382, 383, 384, 385, 386, 387, 388 and 389, which form ports for the valve, and the bore 379 is provided with a port 390, which port 390 is vented to the reservoir R. The grooves 382, 386 and 389 are also vented directly to the reservoir R. The groove 383 is connected to a conduit 391 to which is connected the conduit 348; the groove 384 is connected to a conduit 392; the groove 385 is connected to a conduit 393; the groove 387 is connected to the conduit 308 and to a conduit 394; and the groove 388 is connected to the conduit 375 and to a conduit 395. The conduits 392, 394 and 395 are all connected to a conduit 396 which is connected to a one-way relief valve 397 to the reservoir R. A check valve 398 is disposed between the conduits 395 and 396, as illustrated. It also should be noted that a check valve 399 is disposed within the conduit 308 which is connected between the port 302 of the unloading valve UV–11 and the groove 387 of the control valve CV–11.

The spool member 381 comprises spaced lands 400, 401, 402, 403, 404 and an extending connection portion 406, the lands being separated by grooves 407, 408, 409, 410 and 411. The spool member 381 is movable between various positions corresponding to forward, reverse and neutral drive by means connected to the portion 406 and later to be described, and is resiliently urged or returned to its neutral position as illustrated, by means of a coil spring 412 suitably supported on a movable cup-shaped spring retainer 413 connected to an extension 414 of the spool member 381. The spring acts against a washer 415 abutting the shoulder formed by the juncture of the bores 379 and 380 at one end and a flanged portion of the retainer 414 at the other end. A closure element 416 fixably attached to the housing portion 378 retains the retainer, spring and washer in their assembled relationship. As will be obvious, when the spool 381 is moved to the left, as viewed in the drawings, the washer will also move to the left and the spring 412 will be compressed, so that upon relief, the spring 412 will urge the spool member to its illustrated position. In a similar manner, when the spool 381 is moved to the right the retainer 413 will also be moved to the right thereby compressing the spring 412 which upon relief will urge the spool member to its illustrated position. The land 403 is slightly tapered, as illustrated, for a purpose to be described.

The follow-up control means FC-11 is similar in construction to the follow-up control means FC-1 and comprises a housing portion 417 having a pair of spaced parallel bores 418 and 419 therein. The bore 418 is provided with ports 420, 421, 422, 423 and 424; the ports 420 and 422 are vented to the reservoir R; the port 421 is connected to the conduit 190 which, as previously explained, has connected thereto the conduit 20 from the outlet of the servo pump SP; and the ports 423 and 424 are formed in the housing portion 417 between the bores 418 and 419 and communicates the bores 418 and 419.

A spool member, generally indicated at 425 is slidably received in the bore 418 and comprises spaced lands 426 and 427 separated by a groove 428. The spool member is also provided with an extending rod like portion 429 which passes through an opening 430 in the housing portion 417 for a purpose to be later described. The spool member 425 is urged to its illustrated position by means of coil springs 431 and 432 which act against the outside faces of the lands 426 and 427, respectively.

The bore 419, in addition to the ports 423 and 424, is provided with openings 433 and 434 through which slide rod like means 435 and 436 connected to a slidable piston like means 437 received in the bore 419. An O-ring sealing means 438 surrounds the means 437 as illustrated. The rod like means 435 is connected to the portion 406 of the spool 381 of the control valve CV-11.

The shift lever means SL-11 is similar to the shift lever means SL-1 and comprises a movable and pivotable member 439 to which is pivotably attached, as at 440 and 441, respectively, the rods 429 and 436. There is provided an enlarged end portion 442 for engagement by the operator of the vehicle in which the device is incorporated. The member 439 is pivotable at 441 to provide the indicated drive positions thereof and is movable toward and away from the housing portion 417 enclosing the follow-up control means FC-11 to provide different speed ratio drives, as will be more fully described in detail.

The motor M-11 is similar to the motor M-1 and comprises an intermeshing spur gear type motor which includes a housing 443 having a chamber 444 therein in which are disposed meshing gears 445 and 446. There are also provided ports 447 and 448 comunicating with the motor chamber 444. The ports 447 and 448 may function as inlet or discharge ports depending on the direction of fluid flow. The port 447 is connected to the conduit 391, and the port 448 is connected to the conduit 393.

The sprocket means S-11 is similar to the sprocket means S-1 and includes a sprocket wheel 449 for engagement with a driving track means (not shown) mounted on a stub shaft 450 having a gear 451 drivingly connected thereto. A pinion 452 meshes with the gear 451 to provide a reduction gearing and is connected to the gear 446 of the motor M-11.

The hydraulic transmission, the structure of which has been previously described, is capable of automatic control operation based on the torque requirement of the hydraulic motors M-1 and M-11, to provide a high speed range, an intermediate speed range, and two low speed ranges, one at normal torque and another at high torque. In addition, there is provided means for manually overriding the automatic control of the transmission.

The automatic control operation of the hydraulic transmission will now be described in detail. Assuming that the engine or prime mover (not shown) is operating and driving the driving means D, all of the driving gears of the pumps SP, P-1, P-2, P-3, P-11, P-12 and P-13 will be driven, and the respective pumps will pump fluid from the reservoir R to the inlets and out their outlets into their respective discharge conduits. Thus, the axially loadable bushings of the pumps P-1, P-2, P-3, P-11, P-12 and P-13 will become pressure loaded in the manner set forth in the aforesaid Lauck et al. patent.

With the shift lever means SL-1 and SL-11 in their neutral positions, as illustrated, the control valves CV-1 and CV-11 will also be in their illustrated or neutral positions, so that no communication of fluid pressure is provided between the pumping means and the hydraulic motors M-1 and M-11. This will be obvious since the fluid pressure flowing from the pumps P-1, P-2 and P-3 will flow through the conduits 42 and 72 through the annular grooves 155 and 154 in the control valve CV-1 to the reservoir R through the groove 156.

In a similar manner, the fluid pressure from the pumps P-11, P-12 and P-13 will flow through the conduits 275 and 308, through the groove 389. The fluid under pressure from the pump SP will flow past the check valve 22 in the conduit 21 and to the reservoir R, since the spool members 191 and 425 of the valves FC-1 and FC-11, respectively, are in their illustrated positions, wherein fluid is merely trapped within the bores 183 and 418.

For all of the forward speed drives, the shift lever means 205 and 439 will be pivoted to the indicated forward drive positions thereof. Thus, the spool members 191 and 425 of the valves FC-1 and FC-11, respectively, will be shifted to the left, as viewed in the drawings, against the force of the springs 197 and 431, respectively. With respect to the valve FC-1, the ports 186 and 189 will now be in communication with one another, and with respect to the valve FC-11, the ports 421 and 424 will now be in communication with one another. The pump SP, will supply fluid under pressure, the valve of the pressure being limited by the relief valve 22, through the conduit 20 and thereby to the conduit 190. From the conduit 190 the fluid will flow through the port 186 of the valve FC-1 around the groove 194 of the spool 190 through the port 189 and into the left side of the bore 184. The fluid will thus act on the left face of the piston member 203 and move the piston to the right, shifting the pivot point 207 of the shift lever means SL-1 to the right, and also move the valve member 148 of the control valve CV-1 to the right thereby compressing the spring 177. In a like manner, the fluid in the conduit 190 will flow through the port 421 of the valve FC-11, around the groove 428 of the spool 425, and through the port 424 into the left side of the bore 419 where it will act upon the left face of the piston 437 to move the piston to the right. The movement of the piston 437 to the right will shift the pivot point 441 of the shift lever means SL-11 to the right, and will also shift the valve member 406 of the control valve CV-11 to the right thereby compressing the spring 412.

The shift lever means SL-1 and SL-11 are either manually held in their desired positions or the members 205 and 439 placed into suitable notches (not shown) to retain the lever means in their desired positions, since the springs 177 and 412 will tend to move the control valves CV-1 and CV-11, respectively, to their neutral positions, and further, the springs 197 and 431 will tend to move the spool members 191 and 425, respectively, to their neutral positions.

Looking now at the member 148 of the valve CV-1 in its shifted position (to the right), it will be noted that the lands 169 and 170 isolate the annular groove 155 so as to provide direct communication between the conduits 42 and 162; the lands 168 and 169 isolate the groove 154, so as to provide direct communication between the conduits 72 and 161; the lands 167 and 168 are positioned to provide communication between the conduit 160 and the groove 153 which is vented to the reservoir R; lands 166 and 167 are positioned to provide communication between the conduits 158 and 159. With regard to the valve CV-11, the lands 403 and 405 are positioned to provide communication between the conduits 275 and 395; the lands 402 and 403 are positioned to provide communication between the conduits 308 and 394; the lands 401 and 402 are positioned to communicate the conduit 393 and the groove 386 which is vented to the reservoir R; and the lands 400 and 401 are positioned to communicate the conduits 391 and 392.

The positions of the elements of the valves CV-1, CV-11, FC-1 and FC-11 will remain the same for all of the forward speed drives provided by the transmission. In providing the various speed drives through the transmission, the torque requirement on the hydraulic motor determines the pressure output of the various pressure loaded pumps, as will be explained.

In addition to the fluid flow from the pump outlet thus described, fluid pressure from the outlet 27 of the pump P-1 will flow through the conduit 72, through the ports 65 and 69 of the unloading valve UV-1, into the conduit 74, through the ports 103 and 107 of the overriding valve OV-1 into the passage 119, and through the port 113 into the bore 196 of the unloading valve UV-2. Likewise, fluid pressure from the outlet 260 of the pump P-11 will flow through the conduit 308, through the ports 302 and 298 of the unloading valve UV-11, into the conduit 306, through the ports 341 and 337 of the overriding valve OV-11, into the passage 352, and through the port 346 into the bore 329 of the unloading valve UV-12.

The conduits 43 and 55 convey discharge pressure from the loading chambers 40 and 51 of the pumps P-2 and P-3, respectively, to the unloading valves UV-1 and UV-2. Fluid in the conduit 43 will flow through the ports 64 and 70 of the unloading valve UV-1, into the conduit 75, through the ports 102 and 108 of the overriding valve OV-1, into the passage 120, and through the port 112 of the unloading valve UV-2 into the bore 95. The fluid in the conduit 55 will flow through the ports 66 and 68, into the conduit 73, through the ports 104 and 106, into the passage 118, through the port 114, and into the bore 97 of the unloading valve UV-2.

In a similar manner, it will be noted that the conduits 276 and 288 are connected respectively to the loading chambers 273 and 284 of the pumps P-12 and P-13, so that discharge pressure will flow into these conduits. The fluid flowing in the conduit 276 will flow through the ports 303 and 297 of the unloading valve UV-11, into the conduit 305, through the ports 342 and 336 of the overriding valve OV-11, into the passage 351, and through the port 345 into the bore 328 of the unloading valve UV-12. Fluid in the conduit 288 will flow through the ports 301 and 299 of the unloading valve UV-11, into the conduit 307, through the ports 340 and 338 of the overriding valve OV-11, into the passage 353, through the port 347 of the unloading valve UV-12 and into the bore 330.

In the automatic operation of the transmission, the unloading valves UV-2 and UV-12 will control the automatic shifting between the various speed ratios. The unloading valves UV-1 and UV-11 are inoperative during the automatic operation since they are responsive to higher pressures, as previously explained, and the overriding valves OV-1 and OV-11 together with the cut-off valve CO are also inoperative.

With the fluid flowing as described and the torque requirement at the hydraulic motors M-1 and M-11 at a small value, the transmission will be in its high speed range.

If the torque requirements of the motors is greater than that at the high speed range, the pressure output from pump P-1 will increase and act against the member 143 of the unloading valve UV-2, moving the member 143 and the poppet valve 101 against the force of the spring 144 to allow the fluid flowing to the bore 97 from the chamber 51 of the pump P-3 to flow to the port 116, through the conduit 123, into the conduit 122 and back to the reservoir R. The bushing 50 of the pump P-3, being thus unloaded will move away from the gears 44 and the pump will not pump fluid into its outlet. The ball check valve 54 in the conduit 53 prevents the flow of fluid from the pump P-2 to the pump P-3.

In a like manner, the pressure output from the pump P-11 will increase and act against the member 375 moving the poppet valve 334 off its seat to allow the discharge of pressure from the bore 330 into the conduit 348, to the conduit 355 and to the reservoir R.

The bushing 283 of the pump P-13, being unloaded, will move away from the gears 277, thereby effectively incapacitating the pump P-13. The ball check valve 289 prevents the flow of fluid under pressure from the pump P-12 to the pump P-13. With the pumps P-3 and P-13 effectively incapacitated, the transmission will be in its intermediate speed range.

As the torque requirements on the motors M-1 and M-11 increase, the fluid pressure from the pump P-1 will increase, and in addition to unseating the poppet valve 101 of the unloading valve UV-2, the pressure will act against the member 137 and unseat the poppet valve 100. Then fluid in the bore 95 flowing from the chamber 40 of the pump P-2 will flow through the port 111 to the conduit 122 and to the reservoir R. The discharge of fluid from the chamber 40 allows the bushing 39 of the pump P-2 to move away from the gears 33, so that the pump of P-2 will be rendered ineffective for pumping fluid to the motor M-1. The check valve 165 at the juncture of the conduits 162 and 163 associated with the control valve CV-1 will be in the position shown, being urged by the fluid under pressure flowing in the conduit 161, so as to prevent the flow of high pressure fluid back through the pump P-2 to the reservoir.

In a similar manner, the fluid pressure flowing from the pump P-11 will, in addition to holding the poppet valve 334 unseated, will act against the member 369 and unseat the poppet valve 333 in the unloading valve UV-12, and thereby allow the fluid from the loading chamber 273 of the pump P-12 to flow out of the bore 328, through the port 343 and into the conduit 355 to the reservoir R. This renders the pump P-12 ineffective for supplying fluid under pressure to the motor M-11 by allowing the bushing 272 to move away from the gears 266. The check valve 392 associated with the control valve CV-11 becomes effective to prevent the flow of fluid from the conduit 394 into the conduit 395, and thereby through the pump P-12 to the reservoir R. Thus, the transmission is in its normal low torque speed range.

When the torque requirement at the motors M-1 and M-11 increases to a value greater than that for the normal low torque speed range, the fluid pressure flowing in the conduit 215, through the port 225 of the cut-off valve CO, through the port 224, into the conduit 230, through the port 242, and into the bore 240 of the valve TV becomes sufficient to move the spool member 241 to the right against the force of the spring 250 to thereby connect the ports 244 and 246 by means of the spool groove 255. The port 246 being connected to the reservoir R, allows the discharge of fluid flowing in the conduit 249 connected to the loading chamber 263 of the pump P-11. By allowing the discharge of the fluid in the loading chamber 263, the bushing 262 will move away from the gears 256 and effectively remove the pump P-11 from supplying fluid under pressure to the motor M-11. Under these conditions, the pump P-1 will supply all the fluid to drive the motors M-1 and M-11, the fluid flowing from the conduit 215, into the conduit 231, through the port 247, around the groove 254, through the port 243, into the conduit 248 and into the conduit 391 to the motor M-11, and the transmission will be in its low speed, high torque range.

For reverse speed automatic operation, the shift lever means SL-1 and SL-11 are manually moved to their reverse positions, as illustrated in the drawings, which result in a change in direction of fluid flow to the motors M-1 and M-11, since the valve means of the control valves CV-1 and CV-11 are shifted to the left. Therefore, the fluid flow to the motor M-1 is through the conduit 160 and the discharge of fluid therefrom is through the conduit 215. In a like manner, the fluid flow to the motor M-11 is through the conduit 393 and the discharge therefrom is through the conduit 391. In the reverse speed operation, there are provided a high speed, low torque drive, an intermediate speed and torque drive, and a low speed, high torque drive. The unloading valves UV-2 and UV-12 operate in the same manner as previously described with reference to the forward speed automatic operation of the transmissions in providing these various drives. There is no provision in the reverse speed drive for a lower speed, high torque drive as provided in the previously described forward speed operation, as will be apparent since no connections are provided to convey the fluid flowing from the pump P-1 to the motor M-11. Since it will be obvious to one skilled in the art as to the fluid flow to and from the motor M-1 and M-2 from the various pumps and the manner in which the various pumps are unloaded in a particular sequence, no further explanation is deemed necessary at this time.

As previously indicated, provisions are made for manually overriding the automatic speed control and this is accomplished by the vehicle operator in moving the spool members of the control valves CV-1 and CV-11 to their operative positions. One important consideration in this manual override is the slight taper on the land 169 of the spool 148 of the control valve CV-1 and the corresponding taper on the land 403 of the spool 381 of the control valve CV-11. The fluid from the pumps will flow in the same manner as when the vehicle is in its lowest speed drive which occurs during automatic operation when the spool 148 and the spool 381 are in their extreme right hand positions. However, if the spools are not in their extreme right hand positions, then the amount of fluid flowing to the motors may be controlled because of the tapered lands. In this case the output from the pumps P-2 and P-3 will flow through the conduit 42 and will be exhausted to the reservoir R through the groove 156. Since the closing edge of the land 169 is tapered, the flow of fluid under pressure from the pump P-1 to the motor M-1 may be controlled, part of it going to the reservoir R through the groove 156. In a like manner, the flow of pressure from the pumps P-12 and P-13 will flow to the reservoir R and the amount of fluid from the pump P-11 flowing to the motor M-11 may be controlled due to the tapered closing edge of the land 403. In both cases the flow of fluid under pressure from the pumps P-1 and P-11 to the motors M-1 and M-11, respectively, is prevented from flowing to the reservoir R by means of the check valves 165 and 398, respectively. During this operation, the drive is in low speed range regardless of the torque requirement at the motors. Upon movement of the spools 148 and 381 to their extreme positions as previously described, then the unloading valves UV-2 and UV-12 would become effective to select the speed range, as previously described.

Either track may be operated independently of the other by merely employing one of the shift lever means. Therefore, if one of the control valves is in its neutral position, full engine power can be available at the other track by operating the overriding valve and moving it to the left which is accomplished by moving the cut-off valve to the left. This would make the higher pressure setting unloading valve associated with the particular track effective, the higher pressure unloading valves being similar in operation to the ones previously described. The cut-off valve in its movement to the left has the effect of preventing the flow of fluid from one motor to the other motor, as has previously been described.

With regard to the movement of the overriding valve OV-1 or OV-11 to the left, it will be apparent that the passages or conduits leading between the unloading valves in a particular portion of the transmission will be blocked by the lands of the valve. Further explanation and a description of the fluid flow in such case is deemed unnecessary since it is substantially like that previously described.

While this invention has been described with reference to one particular embodiment thereof, it will be apparent that this is by way of description and not by way of limitation and the appended claim should be construed as broadly as the prior art will permit.

I claim:

In a hydraulic transmission, a combination comprising: a source of fluid; drive means; a plurality of sets of pump means, each pump means having inlet means in fluid communication with said source, a pumping chamber, and outlet means; pumping elements disposed in each pumping chamber and operatively interconnected with said drive means whereby said pumping elements when driven by said drive means are adapted to receive fluid from said inlet means and deliver the same under pressure to said outlet means; means defining pressure chamber means in each pump means adjacent the respective pumping elements; movable end plate means disposed in each chamber means and each having a loaded position whereby the associated pumping elements are adapted to deliver fluid pressure to the respective outlet means and an unloaded position whereby the associated pumping elements are prevented from delivering fluid pressure to the respective outlet means; means communicating fluid pressure from said pump means to said chamber means whereby the respective end plate means are adapted to be moved to said loaded position by the force of the fluid pressure in the respective chamber means; a plurality of hydraulic motor means each having output shaft means subject to varying loads; means defining a plurality of passage means each fluidly interconnecting said outlet means of one set of pump means with one of said motor means whereby the fluid pressure delivered to each said passage means drives the respective said motor means, each set of pump means including communicating means fluidly interconnected with each chamber means of certain of said plurality of pump means thereof and said source, movable valve means disposed in said communicating means and normally in a position preventing fluid communication between said source and said chamber means whereby the end plate means of said certain pump means are adapted to be in said loaded position, said valve means having motive surface means subject to the force of the fluid pressure in the outlet means of the remainder of said plurality of pump means whereby said valve means is moved to other positions when the force exerted by the pressure fluid in the outlet means of said remainder of pump means exceeds a first set of predetermined values and thus permits communication between said source and at least one of said chambers causing the respective end plate means to move to said unloaded position rendering the associated pump means ineffective to deliver fluid pressure to the respective outlet means, said force exerted by the pressure fluid in the outlet means of said remainder of pump means being related to the load on the output shaft means of the respective said motor means whereby the load on said output shaft means determines the speed thereof; bypass means fluidly interconnecting said passage means together; second movable valve means disposed in said bypass means and normally preventing communication between said passage means, said second valve means having motive surface means subject to the force of the pressure fluid in the passage means of one set of pump means whereby said second valve means is moved to another position when said force exerted by the pressure fluid in said one passage means exceeds said first set of predetermined values; said second valve means when in said another position causing said end plate means of the remainder of pump means of the remainder of sets of pump means to move to said unloaded position and permits fluid communication between said passage means through said bypass means whereby said remainder of pump means of said one set of pump means delivers fluid pressure to said plurality of motor means.

References Cited in the file of this patent

UNITED STATES PATENTS

| | | |
|---|---|---|
| 1,179,736 | Manly | Apr. 18, 1916 |
| 1,318,143 | Haffner | Oct. 7, 1919 |
| 2,446,242 | Orshansky | Aug. 3, 1948 |
| 2,505,191 | Lauck | Apr. 25, 1950 |
| 2,642,144 | Brewer | June 16, 1953 |

FOREIGN PATENTS

| | | |
|---|---|---|
| 1,080,123 | France | May 26, 1954 |